United States Patent [19]

Pope

[11] Patent Number: 4,613,180

[45] Date of Patent: Sep. 23, 1986

[54] QUICK-RELEASE DEVICE

[76] Inventor: Ralph D. Pope, P.O. Box 386, Quemado, N. Mex. 87829

[21] Appl. No.: 682,531

[22] Filed: Dec. 17, 1984

[51] Int. Cl.$^4$ .............................................. B66C 1/36
[52] U.S. Cl. ............................. 294/82.34; 24/241 PS; 24/241 SL; 294/82.21
[58] Field of Search ................... 294/75, 82.18–82.21, 294/82.25, 82.27, 82.31–82.34; 24/232 R, 241 P, 241 PP, 241 PS, 241 SL, 241 SB, 241 SP, 242

[56] References Cited

U.S. PATENT DOCUMENTS

| | | | |
|---|---|---|---|
| 28,126 | 5/1860 | Coleman | 24/241 SL X |
| 701,268 | 5/1902 | Howard et al. | 24/232 R X |
| 1,088,614 | 2/1914 | Olstad | 24/241 PS |
| 1,101,113 | 6/1914 | Attfield | 294/82.34 |
| 1,299,821 | 4/1919 | Carpmill et al. | 24/241 SL |
| 1,307,251 | 6/1919 | Gorman | 24/241 PS |
| 1,477,836 | 12/1923 | McGowan | 294/82.34 |
| 1,576,352 | 3/1926 | Nordling | 24/241 SB |
| 2,245,270 | 6/1941 | Goode | 294/82.32 |
| 2,328,341 | 8/1943 | Higgins et al. | 294/82.33 |

Primary Examiner—Johnny D. Cherry
Attorney, Agent, or Firm—Gregory J. Nelson

[57] ABSTRACT

A quick-release device having a pair of jaws which are pivotally connected. The lower jaw includes a receiver which is in the form of an upwardly extending projection having a bore at the upper end of the projection. A locking pin is positioned to reciprocate in a plane parallel to the axis of the device from a latched position engaging the receiver to an unlatched position out of engagement with the receiver. The locking pin assembly also includes associated guide pins on either side of the locking pin to guide the reciprocating travel of the locking pin. When the release cable is pulled, the release cam moves downward causing the locking pin to retract. Axial loads are supported by the heavy axial jaws and not transferred directly to the locking pin so that minimal release force is required even under heavy loads.

5 Claims, 6 Drawing Figures

U.S. Patent   Sep. 23, 1986   4,613,180
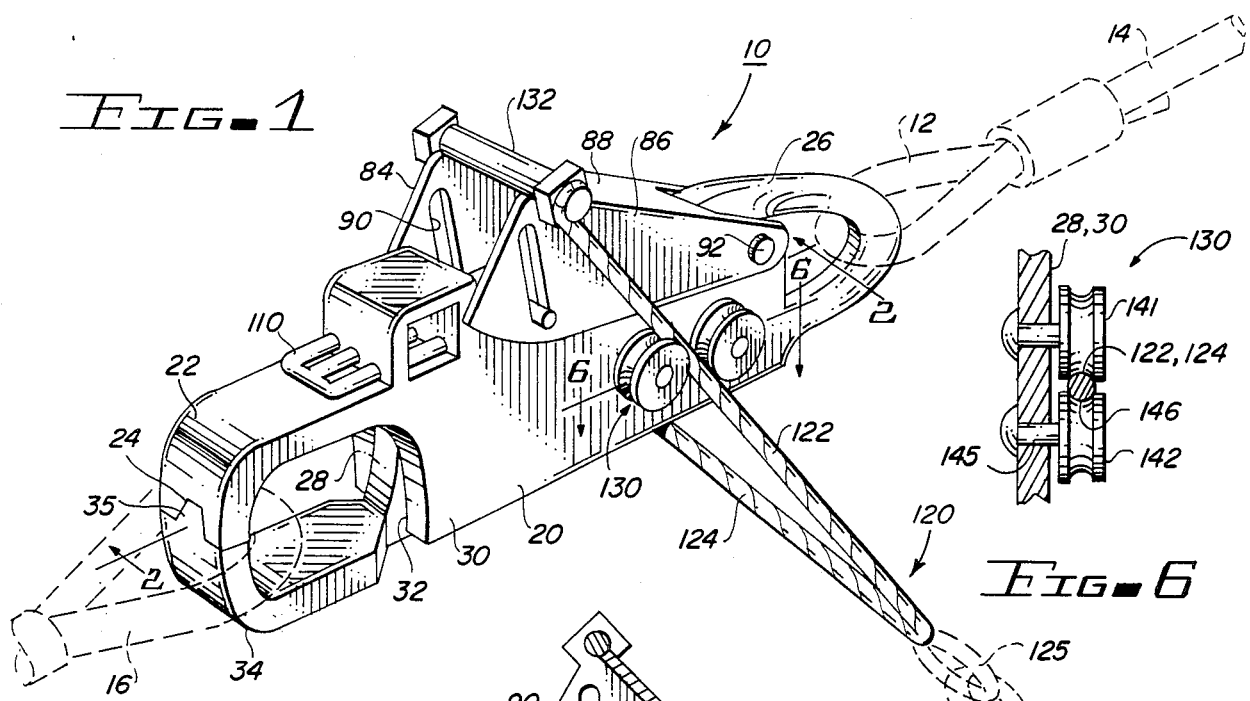
FIG-1
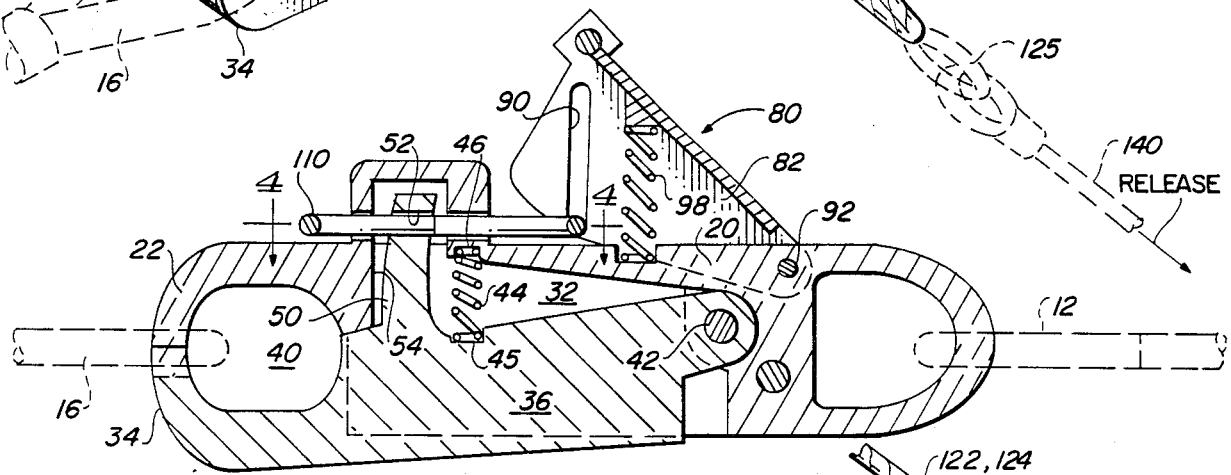
FIG-6
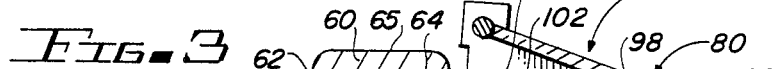
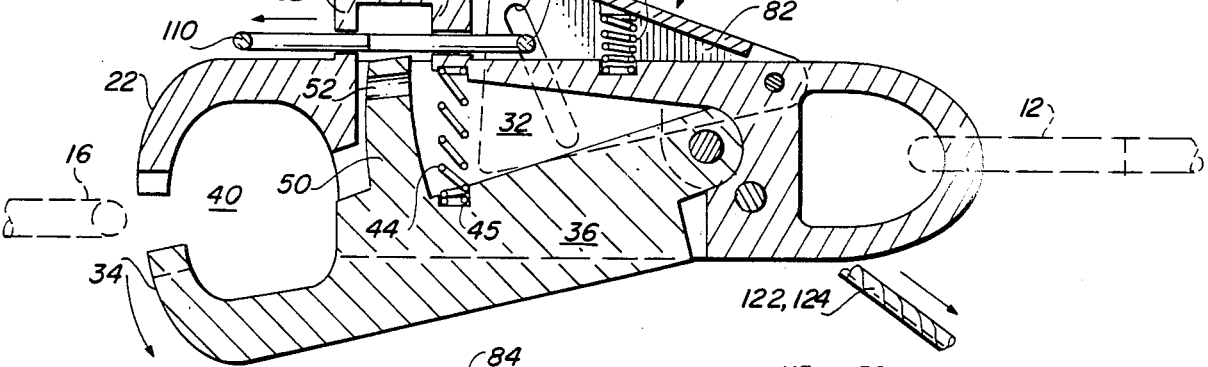
FIG-2
FIG-3
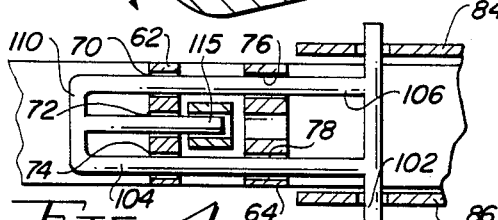
FIG-4
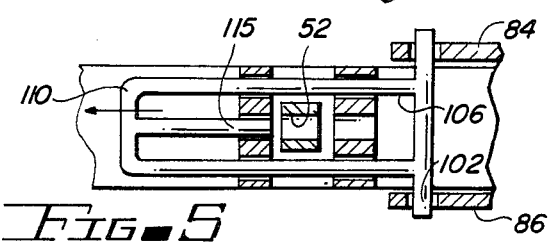
FIG-5

QUICK-RELEASE DEVICE

The present invention relates generally to mechanical quick-release devices and more particularly to release devices which may be positively disengaged while under heavy load which devices are sometimes termed "snap hook" devices.

Various quick-release devices can be found in the prior art for disengaging a load when the load is either attached or suspended from a hook. While many of these devices are suitable for some applications, they generally become difficult or become incapable of release actuation under heavy loads because the load exerted on the jaws of the device is often transmitted to the latching mechanism. Therefore, the operator must overcome at least a portion of the force exerted on the release mechanism in the actuation of the release. In addition to the operational deficiencies, the prior art devices often are complicated and involve structural arrangements which are subject to wear and jamming over a period of use and further are expensive to manufacture. For these reasons, quick-release devices of the general type have limited application and have achieved limited acceptability in the field.

Typical remote coupling or locking devices found in the prior art are represented by the following U.S. Pat. Nos.: 1,576,352; 1,824,843; 2,766,995; 2,894,763; 3,436,795; and 4,379,579.

Accordingly, there exists a substantial need for a mechanical quick-release device which is efficient, effective and inexpensive to manufacture. Devices of this general type have wide application and may be used where it is desired to releasably connect to a heavy load. Typical of such applications are applications for hoisting and lowering equipment, construction applications and towing. In addition, quick-release devices have use in horse equipment such as halters and even sporting equipment such as rock climbing equipment where remote release of lines is required.

Accordingly, it is an object of the present invention to provide a simple, inexpensive, quick-release device which is rugged, compact and has minimum working parts. Another object of the present invention is to provide a quick-release hook device which will positively release even under the application of heavy loads.

Still another object of the present invention is to provide a compact, quick-release device in which axial loads are applied to the load-supporting members and not transferred to the latching mechanism to provide positive load-free release operation.

Therefore, the foregoing and other objects and advantages are attained by the provision of a quick-release device having a pair of jaws which are pivotally connected to one another. The lower jaw includes a keeper which is in the form of an upwardly extending projection having a bore at the upper end. In the latched position, a locking pin is forwardly positioned and engages the bore in the projection to hold the jaws in the latched position. The locking pin assembly extends longitudinally with respect to the jaw assembly and includes guide pins on either side of the locking pins to guide the travel of the locking pin. A release cable is attached to a pivotal release cam. When the cam is actuated, the movement of the cam causes a follower on the locking pin to cause the pin to retract from the receiver permitting the jaws to be released. Axial loads are supported by the heavy axial jaws not directly transmitted to the locking pin which reciprocates in a direction parallel to the imposed loads.

A more complete understanding of the invention and of the advantages thereof will be appreciated upon reference to the following detailed description taken in connection with the accompanying drawings in which:

FIG. 1 is a perspective view of the quick-release device of the present invention shown in an operative position connected to an axially imposed load;

FIG. 2 is a sectional view taken along lines 2—2 of FIG. 1 showing the quick-release device in a closed or latched position;

FIG. 3 is a sectional view similar to FIG. 2 showing the release in an unlatched position;

FIG. 4 is a sectional view of the release device taken along lines 4—4 of FIG. 2 showing the release device in a latched or closed position;

FIG. 5 is a sectional view similar to FIG. 4 showing the release in an open or unlatched position; and FIG. 6 is a sectional view taken along lines 6—6 of FIG. 1.

Referring to the drawings, wherein like reference numerals designate identical or corresponding elements throughout the various views, the quick-release device of the present invention is generally designated by the numeral 10 and is shown in FIG. 1 attached to an eye 12 of cable 14 and oppositely supporting a load at cable eye 16. As pointed out above, the quick-release device 10 has substantial and varied applications and may be used for construction, hoisting and towing as well as sporting applications. In the various applications, the construction and operation of the device is as will be described, it of course being understood that the device can be made in various sizes and of various materials in accordance with the requirements of the particular application.

The device 10 includes a body member 20 which includes a forwardly extending and downwardly curved upper jaw member 22 at the forward end of the body. The upper jaw may be provided with a recess 24 for interengagement with the lower jaw as will be explained. Body 20 is provided with a loop or hook 26 at the rear end for attachment such as to cable 14 at eye 12. The body 20 includes opposite side plates 28 and 30 which define an axially extending recess 32 therebetween. Lower jaw 34 is provided at the forward end of body member 36. Lower jaw 34 has a tooth-like projection 35 which is complimentarily receivable in recess 24. Therefore, with the jaws in the latched or closed position, a loop 40 is defined for attachment of a suitable load 16.

Body member 36 is pivotally secured between side plates 28 and 30 at pivot pin 42 adjacent the rear wall of recess 32. A biasing spring 44 extends between appropriate sockets or recesses 45 and 46 in body members 20 and 36, respectively, to apply a biasing force which urges the members 20 and 36 to a position opening the jaws of the device. In FIG. 2, biasing spring 44 is shown in the compressed position and in FIG. 3 the device is shown in the unlatched position. A keeper member 50 is integrally formed with body member 36 and extends upwardly through latch opening 54 in body 20. The upper end of latch or receiver 50 defines an axially extending aperture 52 positioned above the upper surface of body 20. As viewed in FIGS. 1 to 3, a generally U-shaped latch housing 60 is integrally formed with body 20 and extends across opening 54. Housing 60 includes a vertically extending front wall 62 and rear wall 64 which are interconnected by top 65.

As best seen in FIGS. 4 and 5, the front wall 62 of housing 60 defines three spaced-apart, axially-extending bores 70, 72 and 74. Rear wall 64 defines a pair of spaced-apart apertures 76 and 78 which are aligned, respectively, with bores 70 and 74. Intermediate bore 72 in front wall 62 aligns with bore 52 in keeper 50 when the keeper 50 is in the closed position as shown in FIGS. 2 and 4.

Unlatching and latching of the jaws is accomplished by means of latching assembly 80 which includes a cam member 82 having generally triangular, opposite side plates 84 and 86 joined at their upper edges by transversely extending plate 88. The opposite side plates 84 and 86 each define a cam slot 90 which, in the open position as shown in FIG. 2, extends generally perpendicular with respect to the longitudinal axis of the device. The cam 82 is pivotally connected to body member 20 at pivot pin 92 extending transversely through the body member 20 forward of loop 26. The side plates 84 and 86 extend adjacent opposite side plates 28 and 30 respectively. Resilient biasing means 98 in the form of a spring extends between plate 88 and an appropriate socket in the upper surface of body 20 to urge the latching assembly 80 to the open position shown in FIG. 2. The latch mechanism further incorporates reciprocable locking pin or bolt 100 which has follower member 102 extending transversely through cam slots 90.

Spaced apart parallel guide pins 104 and 106 extend forwardly from the follower 102. Guide member 104 is reciprocal within aligned apertures or bores 74 and 78. Similarly, guide pin 106 is reciprocal within guide apertures or bores 70 and 76. The forward ends of the guide members 104 and 106 are interconnected by bight member 110. Latch pin 115 extends rearwardly from an intermediate position along bight 110 and in the latched position shown in FIGS. 2 and 4, is receivable within bore 52 at the upper end of receiver 50. Latch pin 115 is reciprocally guided within bore 72. With this construction, it will be seen that latch pin 115 is reciprocally guided for axial movement generally parallel to the longitudinal axis of the latch assembly and axial loads will not tend to bind or jam the keeper so that only minimal force is required to operate latching mechanism 80.

The latching mechanism includes a halter 120 having flexible members 122 and 124 connected at their lower end to ring 125. The upper ends of cable members 122, 124 are extended through guide members 130 terminating at the opposite ends of pin member 132 which extends between plates 84 and 86. The upper ends of cable members 122, 124 may be suitably swaged to the end of pin 132. As best seen in FIGS. 1 and 6, guide 130 at either side of body 20 comprises a pair of rollers 141 and 142 mounted for rotation on shaft 145. Halter sections 122 and 124 are threaded through the opening 146 defined by the rollers. It will be apparent that a release force may be applied by means of cable 140 from various angular positions with respect to the cam 80 without binding or interference.

In operation, the release device 10 is connected to a suitable member such as cable eye 12 at loop 26. With the jaws in the open position as shown in FIG. 3, a suitable load is connected by inserting eye 16 between the jaws. The jaws may be manually closed by applying a closing force which can best be accomplished by simultaneously pressing the cam assembly upwardly while manually moving the jaws together. This will cause the locking pin 115 to move rearwardly as the latch assembly 80 is moved upwardly placing the locking pin 115 in engagement with aperture 52 in the receiver projection latching the jaws in the closed position. Upon application of axial force at load 16, the forces are carried axially through the jaw body to the loop and supporting member 14. Little or no axial force is transmitted to the keeper 50 and the locking pin.

When it is desired to open or unlatch the assembly, a pulling force is applied on cable 140 in the direction of the arrow in FIG. 1. This force is transmitted through the halter 120 to the cam assembly 80 causing the cam assembly to pivot downwardly. The downward movement of the cam assembly will force the follower 102 and, accordingly, the locking pin 115 to move forwardly disengaging the locking pin from aperture 52 in the upper end of the keeper. The jaws will then be opened under the influence of resilient member 44. The release cable 140 may be any suitable length leading to a remote location from the device. The roller guide 130 permits the release force to be applied from a wide range of angular positions with respect to the device.

As mentioned above, the quick-release device of the present invention has various applications and the invention may be constructed of various materials and in different sizes and shapes. Further, it will be apparent to those skilled in the art to make various modifications and alterations to the present invention. To the extent that the various alterations and modifications do not depart from the spirit and scope of the appended claims, they are intended to be encompassed therein.

I claim:

1. A quick-release device comprising:
   (a) a first body member having a first jaw member;
   (b) a second body member having a second jaw member engageable with said first jaw member, said first and second body members being pivotally connected at a position longitudinally spaced from said jaw members whereby at least one of said jaw members is pivotal;
   (c) a keeper associated with one of said body members;
   (d) a locking pin disposed generally parallel to the longitudinal axis of said body members and reciprocal between a first position engaging said keeper and a second position out of engagement with said keeper, wherein said locking pin includes an associated guide member disposed generally parallel to said pin, said pin and guide member being reciprocable within guide bores defined by one of said body members; and
   (e) a cam means pivotally mounted on one of said body members moveable to selectively actuate said locking pin between said first and second positions.

2. The quick-release device of claim 1 wherein one of said body members includes a loop associated therewith, said loop being longitudinally opposite said jaws.

3. The quick-release device of claim 1 further including biasing means urging said jaw members to a normally open position.

4. The quick-release device of claim 1 including flexible release means attached to said cam means and extending through rotatable guide means associated with one of said body members.

5. A quick-release device comprising:

(a) a first body member having a surface and a first jaw member at a forward end, said first body member defining a recess therein;

(b) a second body member at least partially received within said recess, said first and second body members being pivotally connected whereby at least one of said members is pivotal with respect to the other, said second body member having a second jaw member at the forward end thereof engageable with said first jaw member in a closed position and with the jaw members disengaged in an open position;

(c) keeper means associated with said second body member and projecting to a location above the surface of said first body member;

(d) locking pin means reciprocal from a first position engaging said keeper means in which said jaw members are closed to an unlatched second position disengaged from said keeper means in which said jaw members are open, said locking pin means including follower means associated therewith;

(e) cam means connected to one of said body members and moveable between first and second positions, said cam means defining a cam surface therein receiving said follower means; and (f) biasing means urging said jaw members to a normally open position whereby movement of said cam means from said first position to said second position will urge said locking pin means to an unlatched position thereby opening said jaw members.

* * * * *